(12) United States Patent
Seo et al.

(10) Patent No.: US 12,499,474 B2
(45) Date of Patent: Dec. 16, 2025

(54) METHOD OF DERIVING QUALITY IMPROVEMENT REQUIREMENTS

(71) Applicant: KOREA INSTITUTE OF SCIENCE & TECHNOLOGY INFORMATION, Daejeon (KR)

(72) Inventors: Su Min Seo, Seoul (KR); Jeong Eun Byun, Seoul (KR); Kuk Jin Bae, Seongnam-si (KR); Yun Jeong Choi, Seoul (KR); Eun Sun Kim, Seoul (KR); Min Je Cho, Seoul (KR); Sung Jin Kim, Incheon (KR); Ju Yeon Shin, Yongin-si (KR); Ji Min Kim, Yongin-si (KR); Min Ju Kim, Seoul (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 149 days.

(21) Appl. No.: 18/610,775

(22) Filed: Mar. 20, 2024

(65) Prior Publication Data
US 2024/0320716 A1    Sep. 26, 2024

(30) Foreign Application Priority Data

Mar. 23, 2023 (KR) .................. 10-2023-0038017
Nov. 29, 2023 (KR) .................. 10-2023-0170130

(51) Int. Cl.
*G06F 17/00* (2019.01)
*G06F 16/951* (2019.01)
(Continued)

(52) U.S. Cl.
CPC ....... *G06Q 30/0282* (2013.01); *G06F 16/951* (2019.01); *G06F 40/289* (2020.01)

(58) Field of Classification Search
None
See application file for complete search history.

(56) References Cited

U.S. PATENT DOCUMENTS 9,600,560 B2 * 3/2017 Hirate ................ G06F 16/30
9,747,342 B2 * 8/2017 Hirate ................ G06Q 10/10
(Continued)

FOREIGN PATENT DOCUMENTS

JP        2016-139216 A    8/2016
KR    10-2018-0080492 A    7/2018
(Continued)

*Primary Examiner* — Satwant K Singh
(74) *Attorney, Agent, or Firm* — Studebaker Brackett PLLC

(57) ABSTRACT

The present disclosure relates to a method of deriving quality improvement requirements. The method according to some embodiments may include receiving a plurality of evaluation information for a first product from an evaluation information database, inputting the plurality of evaluation information into a key phrase extraction model and determining key phrases for the plurality of evaluation information based on an output of the key phrase extraction model, grouping some of the key phrases for the plurality of evaluation information into multiple groups and storing information on each of the multiple groups in a memory, ranking the key phrases included in each of the multiple groups and storing information associated with the ranks of the key phrases included in each of the multiple groups in the memory and determining top n key phrases from each of the multiple groups as quality improvement requirements.

16 Claims, 10 Drawing Sheets

(51) Int. Cl.
  *G06F 40/289*  (2020.01)
  *G06Q 30/0282*  (2023.01)

(56) References Cited

U.S. PATENT DOCUMENTS

| | | | | |
|---|---|---|---|---|
| 11,010,828 | B2* | 5/2021 | Watanabe | G06Q 30/02 |
| 11,531,944 | B2* | 12/2022 | Lapierre | G06Q 10/067 |
| 11,699,177 | B1* | 7/2023 | Alexandrov | G06F 16/951 |
| | | | | 707/738 |
| 11,915,173 | B2* | 2/2024 | Lapierre | G06Q 10/087 |
| 2021/0264480 | A1* | 8/2021 | Silverstein | G06F 16/951 |

FOREIGN PATENT DOCUMENTS

| | | |
|---|---|---|
| KR | 10-2021-0023452 A | 3/2021 |
| KR | 10-2021-0044017 A | 4/2021 |
| KR | 10-2021-0082880 A | 7/2021 |
| KR | 10-2022-0025540 A | 3/2022 |
| KR | 10-2022-0086932 A | 6/2022 |
| KR | 10-2505204 B1 | 3/2023 |

* cited by examiner

FIG. 9

| Topic keywords | Key-phrase(Top 3) | Count | Sum |
|---|---|---|---|
| Price | I bought it at a good price | 172 | 149.74 |
| | Cost-effectiveness | 106 | 95.22 |
| | It's cost-effective | 90 | 74.40 |
| Purchase | I bought it at a good price | 172 | 149.74 |
| | I bought it at a good price and recommend it | 25 | 24.71 |
| | Several purchases already | 6 | 5.34 |
| ... | ... | ... | ... |

91 — Topic keywords
92 — Key-phrase(Top 3)
93 — Count
94 — Sum

METHOD OF DERIVING QUALITY IMPROVEMENT REQUIREMENTS

CROSS-REFERENCE TO RELATED APPLICATION

This application claims priority from Korean Patent Application No. 10-2023-0038017 filed on Mar. 23, 2023 and Korean Patent Application No. 10-2023-0170130 filed on Nov. 29, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a method of deriving quality improvement requirements and a system to which the method is applied, and more particularly, to a method and system for deriving necessities for quality improvement of a product based on evaluation information for the product from buyers.

2. Description of the Related Art

Recently, with the activation of online shopping, customers can purchase products online and write reviews. Therefore, companies can easily collect customer data and use collected product review data to improve their products and services, thereby enhancing their competitiveness.

However, it has become increasingly difficult to identify customer requirements from multiple product reviews because the attributes of each product can be extensive, and customers may even evaluate attributes that companies did not intend.

For example, referring to FIG. 1, when a customer review 11 mentions "the cord is too short," "the suction is good," and "it is easy to clean," an expert opinion 12 should derive requirements like changing the wiring design to extend the cord's length from the customer review 11. Conventionally, due to the differences in expressions between consumers and producers or manufacturers, there have been problems in deriving requirements for quality improvement of products.

Therefore, there is a demand for a method that can derive the required quality reflected by customers' perspective through the analysis of customer reviews. However, due to the aforementioned problems, such a method has not been traditionally provided.

SUMMARY

Aspects of the present disclosure provide a method of categorically compiling customer complaints that need to be addressed by manufacturers to facilitate the sale of products.

Aspects of the present disclosure also provide a transformer model that has been specially trained for a product evaluation domain.

Aspects of the present disclosure also provide a method of extracting key words from product evaluation information.

Aspects of the present disclosure also provide a method of extracting key phrases with the highest relevance to quality improvement requirements from key words extracted from product evaluation information.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a method of deriving quality improvement requirements performed by a computing system. The method may include: receiving a plurality of evaluation information for a first product from an evaluation information database, inputting the plurality of evaluation information into a key phrase extraction model and determining key phrases for the plurality of evaluation information based on an output of the key phrase extraction model, grouping some of the key phrases for the plurality of evaluation information into multiple groups and storing information on each of the multiple groups in a memory, ranking the key phrases included in each of the multiple groups and storing information associated with the ranks of the key phrases included in each of the multiple groups in the memory and determining top n key phrases from each of the multiple groups as quality improvement requirements, based on ranking results for the key phrases included in each of the multiple groups.

In some embodiments, The method may further include: crawling the plurality of evaluation information for the first product from the Internet.

In some embodiments, wherein the key phrase extraction model may include a transformer model trained based on evaluation information for multiple products.

In some embodiments, wherein the determining the key phrases for the plurality of evaluation information may comprise extracting n candidate phrases from each of the plurality of evaluation information, ranking the candidate phrases based on weighted averages and weighted sums of the candidate phrases and a number of times each of the candidate phrases is included in the plurality of evaluation information, and determining the key phrases for the plurality of evaluation information based on ranking results for the candidate phrases.

In some embodiments, The method may further include: further comprising determining key words for the key phrases for the plurality of evaluation information, based on the key phrases for the plurality of evaluation information.

In some embodiments, wherein the determining the key words for the key phrases for the plurality of evaluation information may comprise extracting nouns and roots contained in each of the key phrases for the plurality of evaluation information.

In some embodiments, wherein the grouping some of the key phrases for the plurality of evaluation information may comprise extracting topic words for a plurality of topics from the plurality of evaluation information, and grouping some of the key phrases for the plurality of evaluation information into multiple groups based on similarities between the key words and the topic words.

In some embodiments, wherein the ranking the key phrases included in each of the multiple groups may comprise ranking key phrases included in a first group, among the multiple groups, based on weighted averages and weighted sums of the corresponding key phrases and a number of times each of the corresponding key phrases is included in the first group.

According to another embodiments of the present disclosure, there is provided a computing system. The system may include: at least one processor, and a memory storing one or more instructions, wherein by executing the stored instructions, the at least one processor performs operations of: receiving a plurality of evaluation information for a first product from an evaluation information database, inputting the plurality of evaluation information into a key phrase extraction model and determining key phrases for the plurality of evaluation information based on an output of the key phrase extraction model, grouping some of the key phrases for the plurality of evaluation information into multiple groups and storing information on each of the multiple groups in a memory, ranking the key phrases included in each of the multiple groups and storing information associated with the ranks of the key phrases included in each of the multiple groups in the memory, and determining top n key phrases from each of the multiple groups as quality improvement requirements, based on ranking results for the key phrases included in each of the multiple groups.

In some embodiments, wherein the operation of determining the key phrases for the plurality of evaluation information may comprise operations of: extracting n candidate phrases from each of the plurality of evaluation information, ranking the candidate phrases based on weighted averages and weighted sums of the candidate phrases and a number of times each of the candidate phrases is included in the plurality of evaluation information, and determining the key phrases for the plurality of evaluation information based on ranking results for the candidate phrases.

In some embodiments, wherein the at least one processor may further perform an operation of determining key words for the key phrases for the plurality of evaluation information, based on the key phrases for the plurality of evaluation information.

In some embodiments, wherein the operation of determining the key words for the key phrases for the plurality of evaluation information may comprise an operation of extracting nouns and roots contained in each of the key phrases for the plurality of evaluation information.

In some embodiments, wherein the operation of grouping some of the key phrases for the plurality of evaluation information may comprise operations of: extracting topic words for a plurality of topics from the plurality of evaluation information, and grouping some of the key phrases for the plurality of evaluation information into multiple groups based on similarities between the key words and the topic words.

In some embodiments, wherein the operation of ranking the key phrases included in each of the multiple groups may comprise an operation of ranking key phrases included in a first group, among the multiple groups, based on weighted averages and weighted sums of the corresponding key phrases and a number of times each of the corresponding key phrases is included in the first group.

In some embodiments, wherein the at least one processor may further perform an operation of crawling the plurality of evaluation information for the first product from the Internet.

In some embodiments, wherein the key phrase extraction model may include a transformer model trained based on evaluation information for multiple products.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a flowchart for explaining how to rank key phrases included in each group, as performed in some embodiments of the present disclosure.

DETAILED DESCRIPTION

Figure 1:
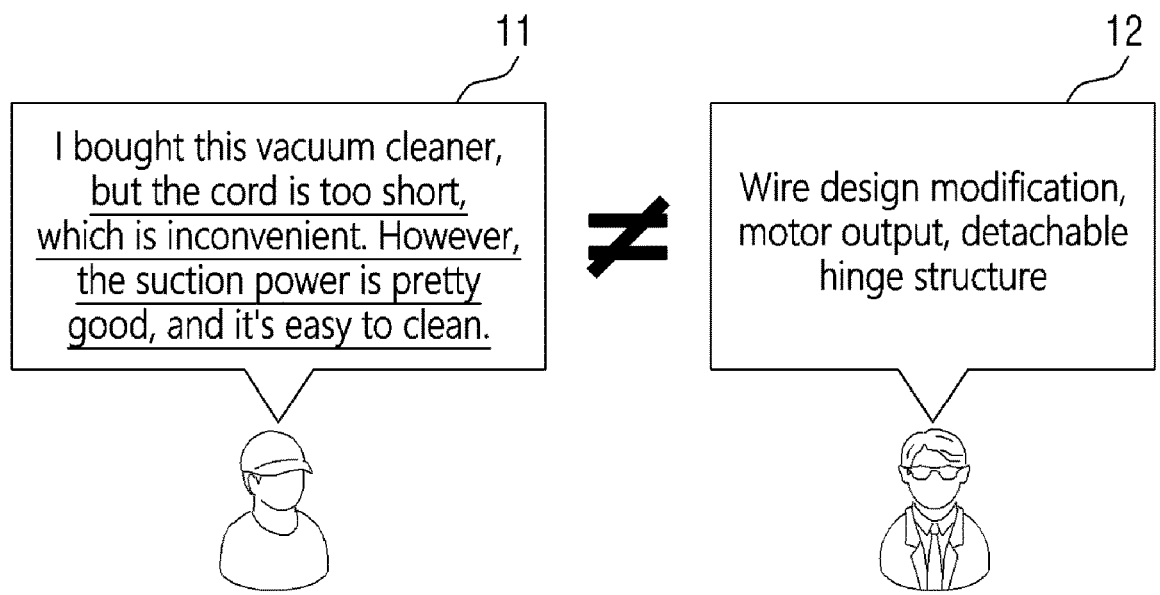
FIG. 1 is a schematic diagram for explaining the discrepancy in how to derive quality characteristics between a consumer and an expert of a product.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will hereinafter be described with reference to the accompanying drawings.

Figure 2:
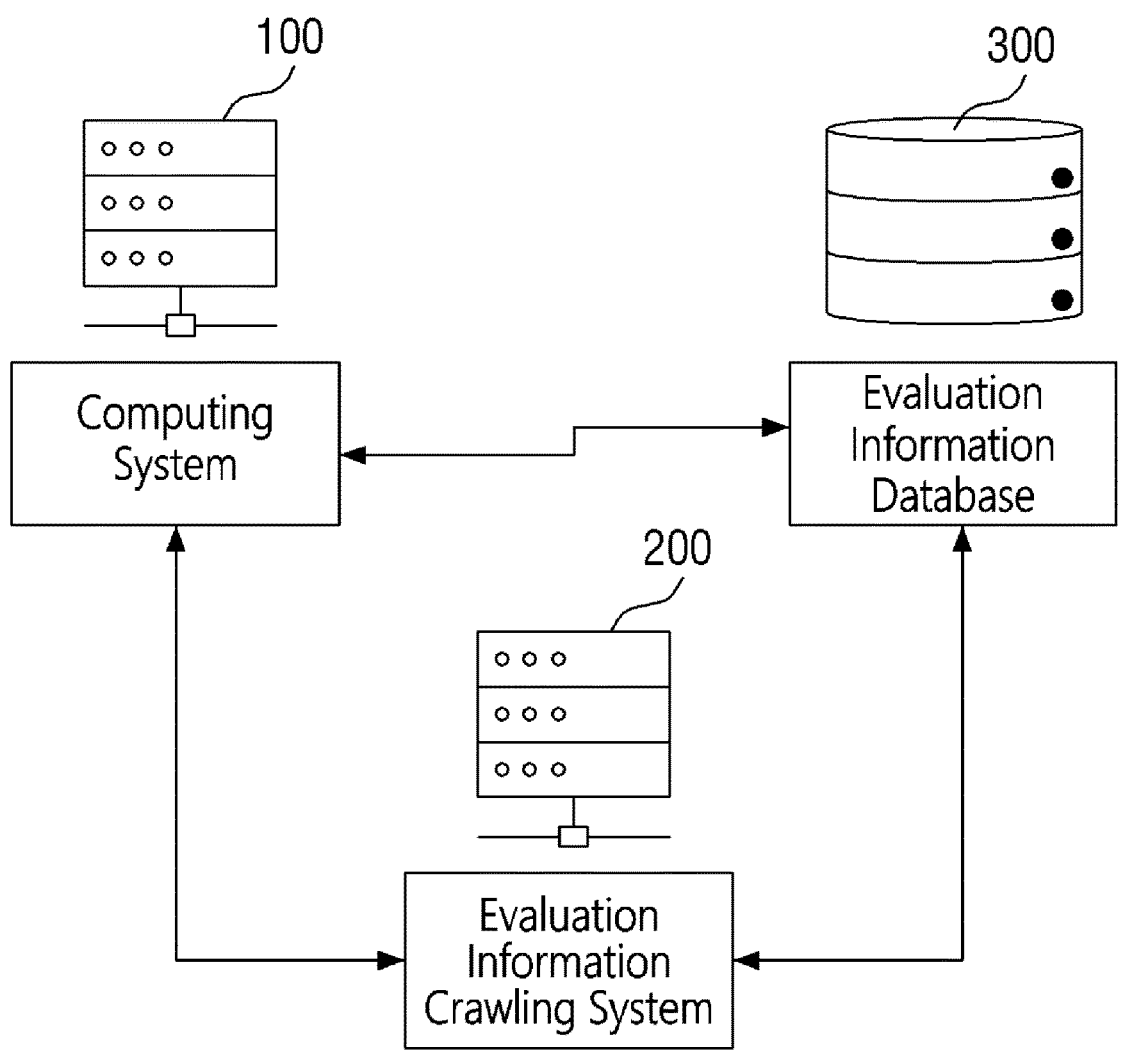
FIG. 2 is a schematic diagram illustrating an exemplary environment to which a computing system according to an embodiment of the present disclosure can be applied.

FIG. 2 is a schematic diagram illustrating an exemplary environment to which a computing system 100 according to an embodiment of the present disclosure can be applied.

Each component depicted in FIG. 2 may be implemented as, but is not limited to, software or hardware, such as a field programmable gate array (FPGA) or an application-specific integrated circuit (ASIC). Each component depicted in FIG. 2 may be configured to reside in an addressable storage medium or to execute one or more processors. The functions provided within each component can be implemented by further sub-divided components, and multiple components can be combined together to implement a single component that performs a specific function.

In some embodiments, the computing system 100 may communicate with other components via a network. The network may be implemented as any type of wired or wireless network, such as a local area network (LAN), wide area network (WAN), mobile radio communication network, Wireless Broadband Internet (WiBro), etc.

The computing system 100, an evaluation information crawling system 200, and an evaluation information database 300 may be understood as operating according to a server-client model. However, in some embodiments, the computing system 100, the evaluation information crawling system 200, and the evaluation information database 300 may be configured to operate in a client stand-alone manner without the need for a server. In this case, operations performed by the evaluation information crawling system 200 and the evaluation information database 300 may be understood as being performed by the computing system 100.

The computing system 100 may receive a plurality of evaluation information for a first product from the evaluation information database 300.

In some embodiments, the plurality of evaluation information for the first product may be stored in the evaluation information database 300 as a result of the evaluation information crawling system 200 performing crawling on web pages related to the first product.

In some embodiments, the computing system 100 may input the evaluation information for the first product into a key phrase extraction model and determine a key phrase for each of the plurality of evaluation information for the first product based on the output of the key phrase extraction model, and this will be described later.

In some embodiments, the computing system 100 may determine a key word for the key phrase for each of the plurality of evaluation information for the first product.

In some embodiments, the computing system 100 may group some of the key phrases from the plurality of evaluation information for the first product into multiple groups.

In some embodiments, the computing system 100 may rank the key phrases included in each of the multiple groups.

The components included in the exemplary environment to which the computing system 100 can be applied and the operations that can be performed by these components have been described so far with reference to FIG. 2. The aforementioned examples are merely exemplary in all respects and should be understood as not limiting. Furthermore, the configuration and operation of the computing system 100 can be supplemented through some embodiments that will hereinafter be described.

A method of deriving quality improvement requirements according to an embodiment of the present disclosure will hereinafter be described with reference to FIGS. 3 through 9. Steps to be described in some flowcharts will be understood as being performed by the computing system 100 of FIG. 1 unless otherwise mentioned. Moreover, it should be understood that the technical concepts described in the embodiment of FIG. 2 can be obviously applied to the method of deriving quality improvement requirements.

Figure 3:
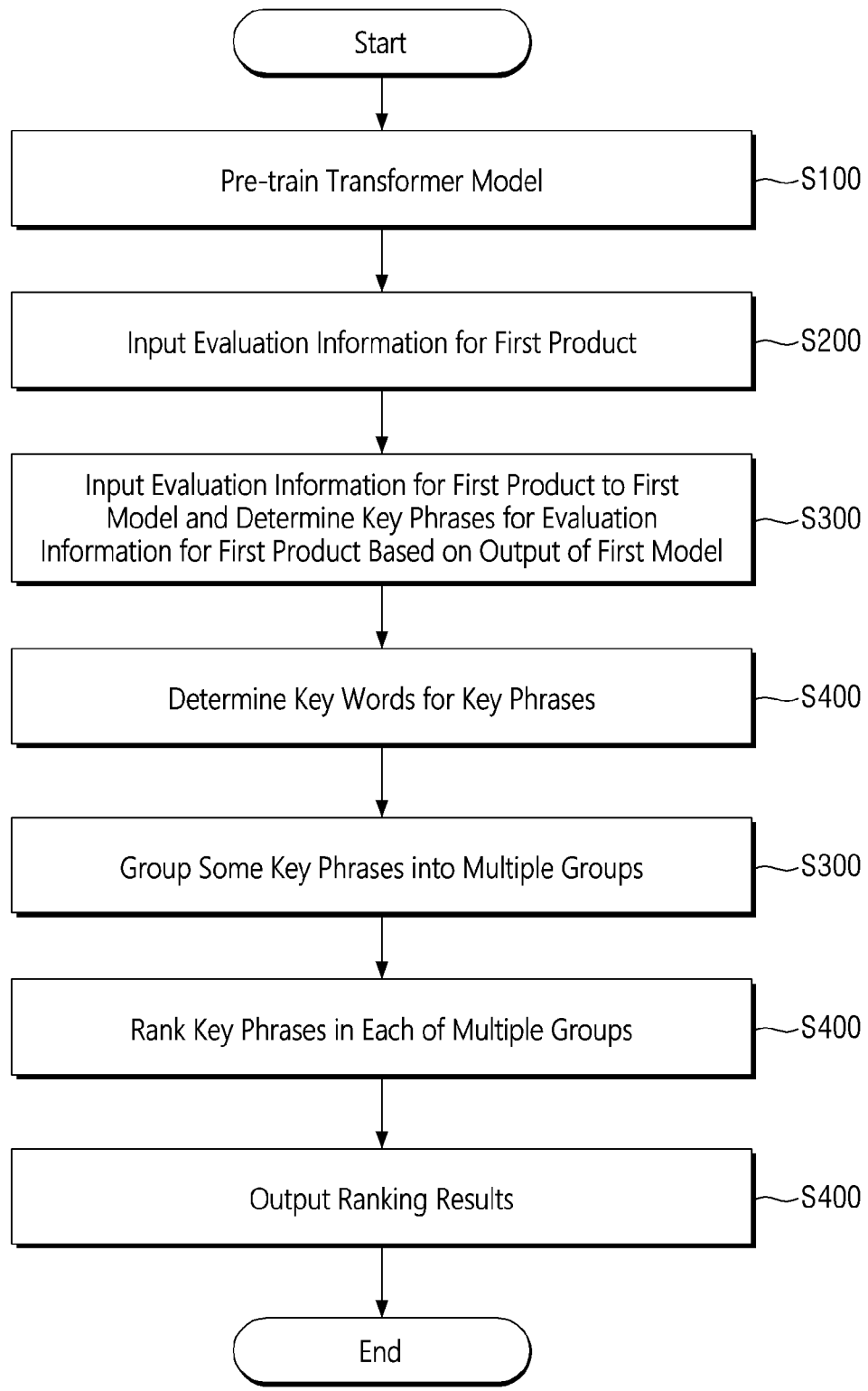
FIG. 3 is a flowchart illustrating a method of deriving quality improvement requirements according to an embodiment of the present disclosure.

Referring to FIG. 3, in step S100, the computing system 100 may pre-train an initial transformer model. Here, the initial transformer model may become the embedding model of a key phrase extraction model according to some embodiments of the present disclosure, based on training data received from the evaluation information database 200, and this will be described later in further detail.

In some embodiments related to step S100, the transformer model may include, but is not limited to, BERT, GPT, AlphaFold, etc., and may be any transformer neural network that can be used for natural language processing.

In some embodiments related to step S100, the computing system 100 may receive training data from the evaluation information database 200. Moreover, the computing system 100 may classify the received training data into data for use in training the initial transformer model and data for performance evaluation of the embedding model of the key phrase extraction model.

In some embodiments related to step S100, the computing system 100 may further classify the data for use in training the transformer model into data for additional pre-training and data for fine-tuning.

In some embodiments related to step S100, the computing system 100 may acquire an additionally pre-trained transformer model by pre-training the initial transformer model by training a masked language model (MLM) based on the data for additional pre-training.

For example, the computing system 100 may train the initial transformer model to mask words like "the sound is" and "the suction is" from product evaluation data including phrases like "the sound is adequate but the suction is disappointing" and to predict the masked words predict words.

In some embodiments related to step S100, by inputting evaluation information and evaluation scores for multiple products into the additionally pre-trained transformer model, the computing system 100 may fine-tune the additionally pre-trained transformer model to predict evaluation scores based on product evaluation information. Consequently, the computing system 100 can acquire the embedding model of the key phrase extraction model.

In some embodiments related to step S100, the embedding model of the key phrase extraction model may determine specific evaluation information for a product as either positive or negative evaluation information, based on the evaluation score for the product, predicted by the embedding model of the key phrase extraction model based on the product's evaluation information.

In some embodiments related to step S100, the computing system 100 may perform a performance comparison between the initial transformer model and the embedding model of the key phrase extraction model.

In step S200, the computing system 100 may receive evaluation information for the first product.

Specifically, in step S200, the computing system 100 may receive the evaluation information for the first product from the evaluation information database 300.

In step S300, the computing system 100 may input the evaluation information for the first product into the key phrase extraction model and determine key phrases of the evaluation information for the first product based on the output of the key phrase extraction model.

The key phrase extraction model will hereinafter be described with reference to FIG. 4.

Figure 4:
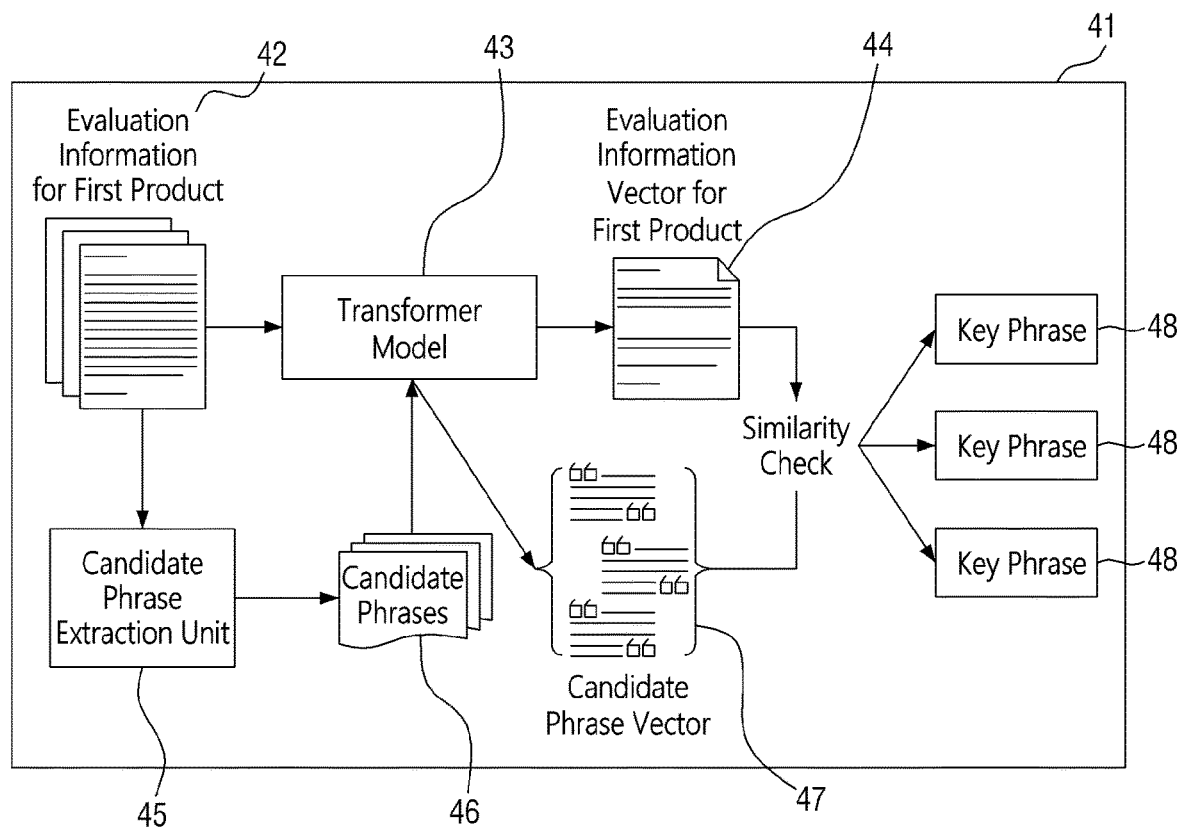
FIG. 4 is a schematic diagram for explaining a key phrase extraction model according to some embodiments of the present disclosure.

Referring to FIG. 4, in some embodiments, a candidate phrase extraction unit 45 of a key phrase extraction model 41 may output candidate phrases 46 based on evaluation information 42 for the first product.

In some embodiments, the key phrase extraction model 41 may input the evaluation information 42 for the first product and the candidate phrases 46 into a transformer model 43. In response, the transformer model 43 may output an evaluation information vector 44 and a candidate phrase vector 47 for the first product. Here, the transformer model 43 may refer to the transformer model built in step S100 of FIG. 3.

In some embodiments, the key phrase extraction model 41 may output key phrases 48 as a result of performing a similarity check on the evaluation information vector 44 and the candidate phrase vector 47 for the first product.

The key phrase extraction model can accurately extract important key words from product reviews, compared to a conventional open-source transformer model, by embedding words from product reviews based on a transformer model specialized for product reviews.

Step S300 of FIG. 3 will hereinafter be described with reference to FIG. 5.

Figure 5:
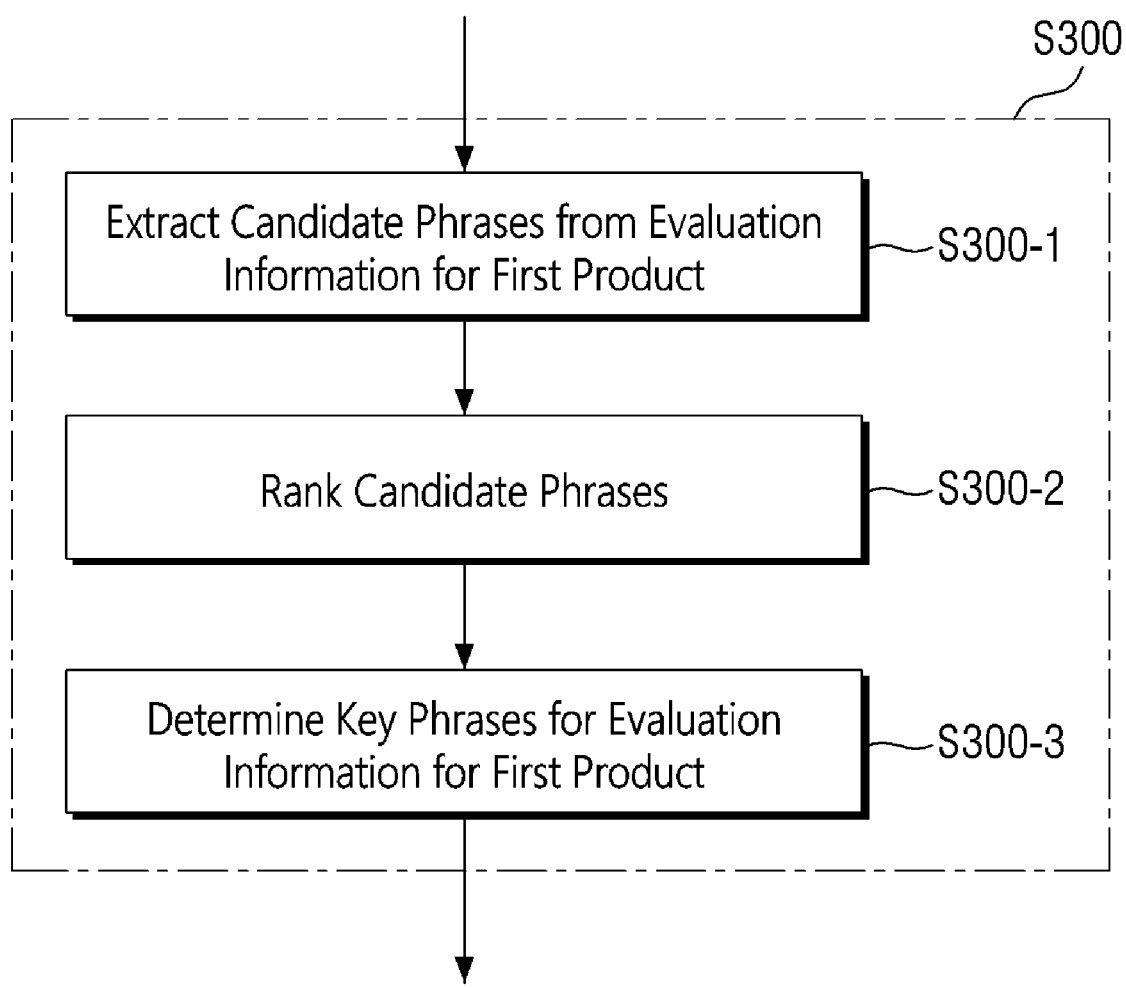
FIG. 5 is a detailed flowchart for explaining step S300 of FIG. 3.

Referring to FIG. 5, in step S300-1, the computing system 100 may extract candidate phrases from each of the plurality of evaluation information for the first product. Here, the candidate phrases may refer to the key phrases 48 output by the key phrase extraction model 41 of FIG. 4.

Figure 6:
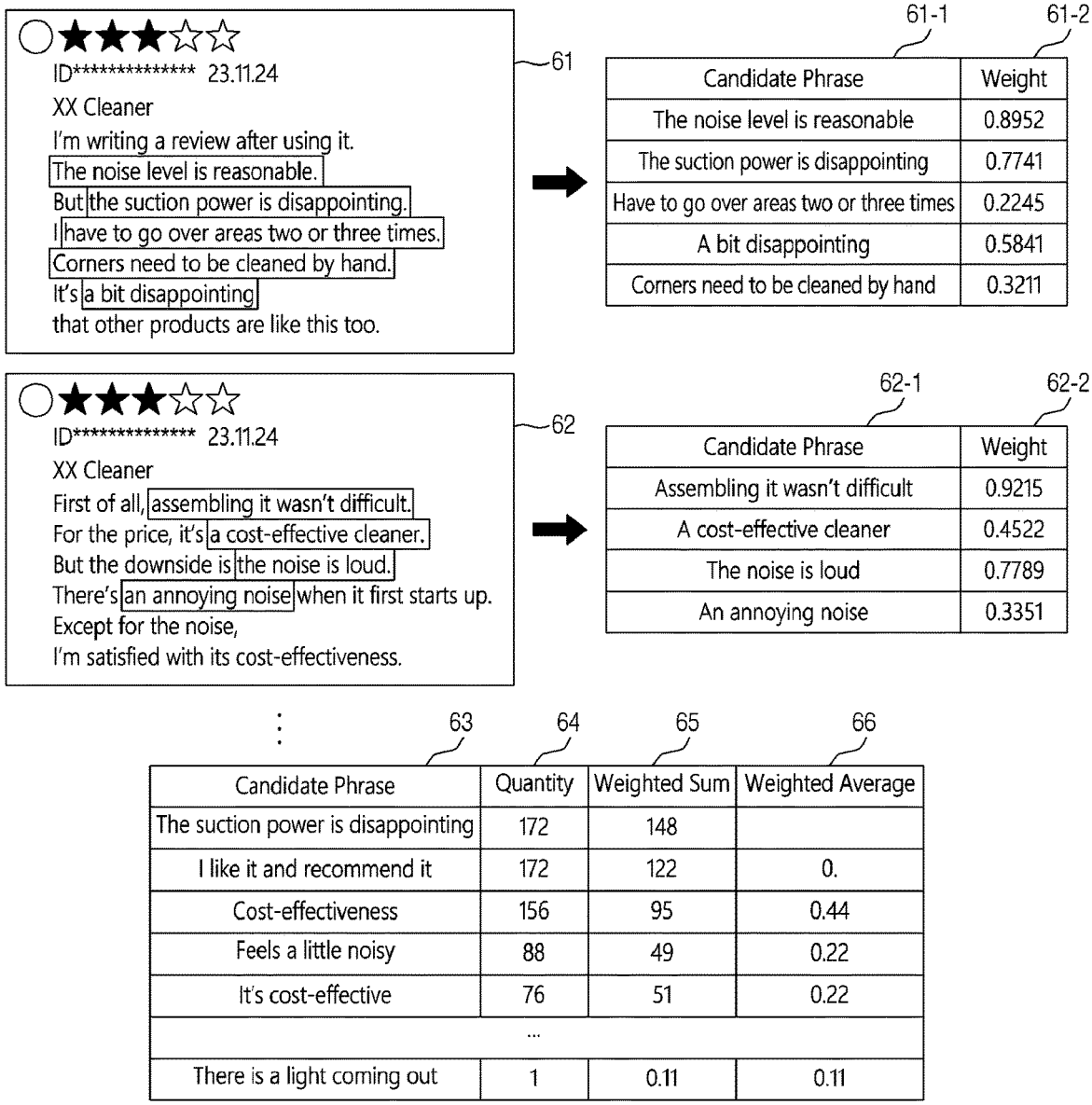
FIG. 6 is a flowchart for explaining how to determine key phrases for a plurality of evaluation information, as performed in some embodiments of the present disclosure.

Referring to FIG. 6, in some embodiments related to step S300-1, the computing system 100 may input first evaluation information 61 and second evaluation information 62 for the first product into the key phrase extraction model and determine candidate phrases 61-1 for the first evaluation information 61, candidate phrases 62-1 for the second evaluation information 62, and weights 61-1 for the candidate phrases 61-1, and weights 62-2 for the candidate phrases 62-1.

FIG. 6 illustrates that each of the candidate phrases 61-1 or 62-1 includes at least two or three words, but the number of words that can be contained in each candidate phrase is not particularly limited.

Additionally, it can be clearly understood by one of ordinary skill in the art that the results of key phrase extraction by the computing system 100 may vary depending on the number of words contained in each of candidate phrases (61-1 and 62-1). In step S300-2, the computing system 100 may rank the candidate phrases for each of the plurality of evaluation information for the first product.

Referring to FIG. 6, in some embodiments related to step S300-2, the computing system 100 may rank and arrange candidate phrases 63, extracted from evaluation information for the first product, based on a weighted sum 65 and a weighted average 66 of each candidate phrase 63 and a number 64 of times each candidate phrase 63 is included in the evaluation information for the first product. In step S300-3, the computing system 100 may determine key phrases for the plurality of evaluation information for the first product based on the ranking results for the candidate phrases for each of the plurality of evaluation information for the first product.

For example, referring to FIG. 6, the computing system 100 may determine the phrase "the suction power is disappointing" as a key phrase for the first evaluation information 61 based on the ranks of the candidate phrases 63, considering that the corresponding phrase is in the top n ranks among the candidate phrases 63.

For another example, referring to FIG. 6, the phrase "the sound is adequate" included in the first evaluation information 61 is not in the top n ranks among the candidate phrases 63. Thus, the computing system 100 may determine the phrase "the sound is adequate" as not being a key phrase of the first evaluation information 61.

In some embodiments, the aforementioned key phrase extraction method may be understood as being able to exhibit the highest performance when top five ranked candidate phrases, each with three words, are selected as key phrases and a maximal marginal relevance (MMR)-based diversity parameter is set to 0.8.

According to this embodiment, the computing system 100 can extract key phrases with the highest relevance to the quality improvement requirements for the first product from the plurality of evaluation information for the first product.

Referring further to FIG. 3, in step S400, the computing system 100 may determine a key word for the key phrase from each of the plurality of evaluation information for the first product.

In some embodiments related to step S400, the computing system 100 may extract nouns and roots contained in the key phrase from each of the plurality of evaluation information for the first product to determine a key word for the key phrase from each of the plurality of evaluation information for the first product.

For example, referring to FIG. 6, the computing system 100 may determine the words "suction" and "disappointing" as key words for the key phrase "the suction power is disappointing" from the first evaluation information 61.

In step S500, the computing system 100 may group some of the key phrases from the plurality of evaluation information for the first product into multiple groups.

Figure 7:
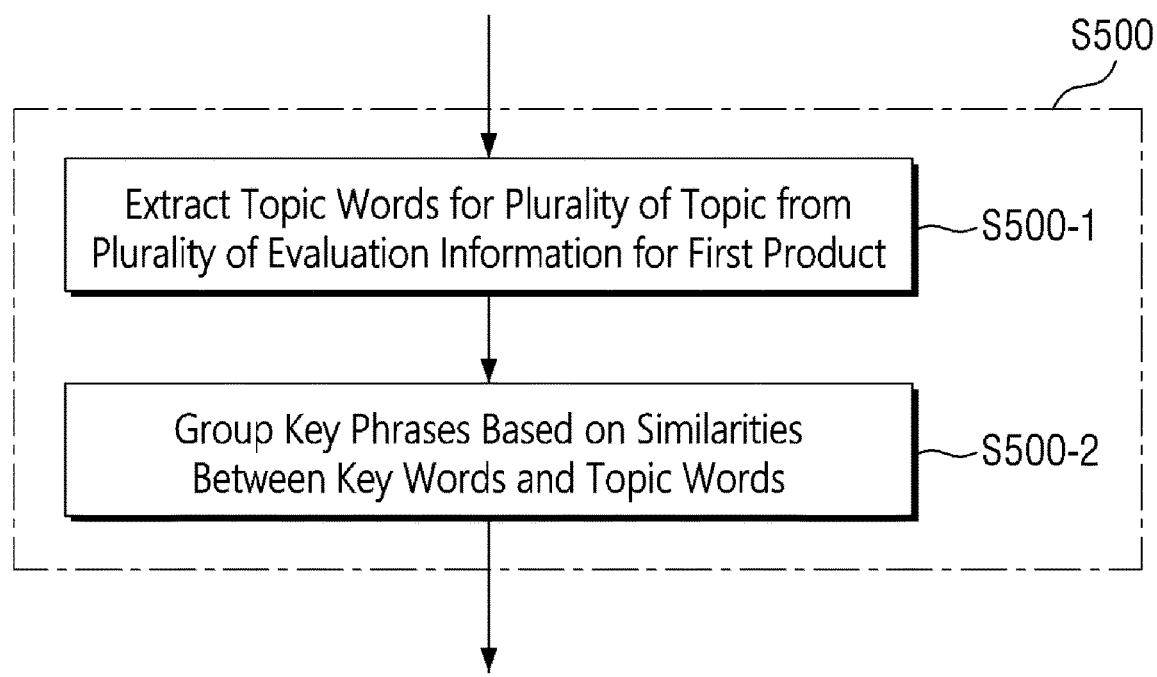
FIG. 7 is a detailed flowchart for explaining step S500 of FIG. 3.

Step S500 will hereinafter be described with reference to FIGS. 7 and 8.

In step S500-1, the computing system 100 may extract topic words corresponding to the topics from the plurality of evaluation information for the first product. The extraction of the topic words may be performed based on an algorithm for use in topic modeling, such as Latent Dirichlet Allocation (LDA) or Probabilistic Latent Semantic Analysis (PLSA).

Figure 8:
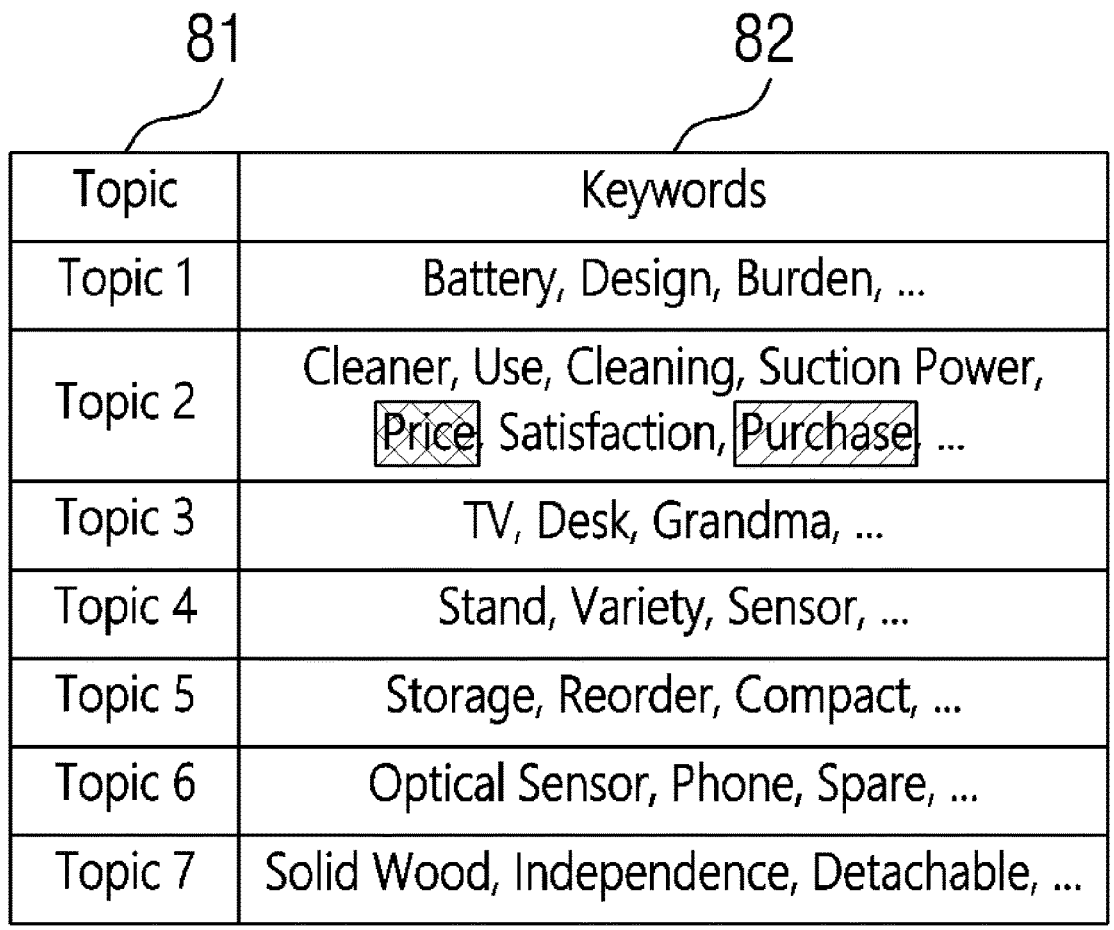
FIG. 8 is a flowchart for explaining how to extract topic words for a plurality of topics from a plurality of evaluation information for a first product, as performed in some embodiments of the present disclosure.

Referring to FIG. 8, in some embodiments related to step S500-1, the computing system 100 may extract topic words 82 for a predefined number of topic groups 81 from a plurality of evaluation information for the first product.

In some embodiments related to step S500-1, the number of topic words 82 included in each of the topic groups 81 may be determined based on the topic coherence between the topic words 82 included in a corresponding topic group 81. The method of determining the number of topic words based on topic coherence can be clearly understood by one of ordinary skill in the art.

In step S500-2, the computing system 100 may group key phrases based on the similarities between the key words of the key phrases from the plurality of evaluation information for the first product and the topic words.

For example, referring to FIGS. 6 and 8, since the word "suction," which is a key word from the key phrase "the suction power is disappointing" for the first evaluation information 61, is highly similar to a "suction" topic word 82 for the first product, the key phrase "the suction power is disappointing" may be grouped into a "suction" topic.

Referring further to FIG. 3, in step S600, the computing system 100 may rank the key phrases included in each of the multiple groups.

In some embodiments related to step S600, the computing system 100 may rank the key phrases of a first group among the multiple groups based on the weighted averages and weighted sums of the key phrases of the first group, and the number of times each key phrase in the first group is included in the first group.

For example, referring to FIG. 9, the computing system 100 may rank key phrases 92 from a "price" topic group 91, extracted from the plurality of evaluation information for the first product, based on weighted averages (not shown) and weighted sums 94 of the key phrases 92 from the "price" topic group 91, and the number of times each of the key phrases 82 from the "price" topic group 91 is included in the plurality of evaluation information for the first product.

For another example, referring to FIG. 9, the computing system 100 may rank key phrases 92 from a "purchase" topic group 91, extracted from the plurality of evaluation information for the first product, based on weighted averages (not shown) and weighted sums 94 of the key phrases 92 from the "purchase" topic group 91, and the number of times each of the key phrases 82 from the "purchase" topic group 91 is included in the plurality of evaluation information for the first product.

In some embodiments related to step S600, the computing system 100 may determine the top m key phrases from each of the multiple groups as quality improvement requirements for the first product, based on the ranking results for the key phrases included in each of the multiple groups.

According to this embodiment, a user can easily identify the key requirements for quality improvement of a product by topic.

In step S700, the computing system 100 may output the ranking results for each of the multiple groups from the plurality of evaluation information for the first product, obtained in step S600.

In some embodiments related to step S700, the computing system 100 may determine the top n key phrases from each of the multiple groups as quality improvement requirements and output the quality improvement requirements.

The method of deriving quality improvement requirements according to an embodiment of the present disclosure has been described so far with reference to FIGS. 2 through 9. The aforementioned examples and embodiments should be understood as being merely exemplary in all aspects and not limiting.

Figure 10:
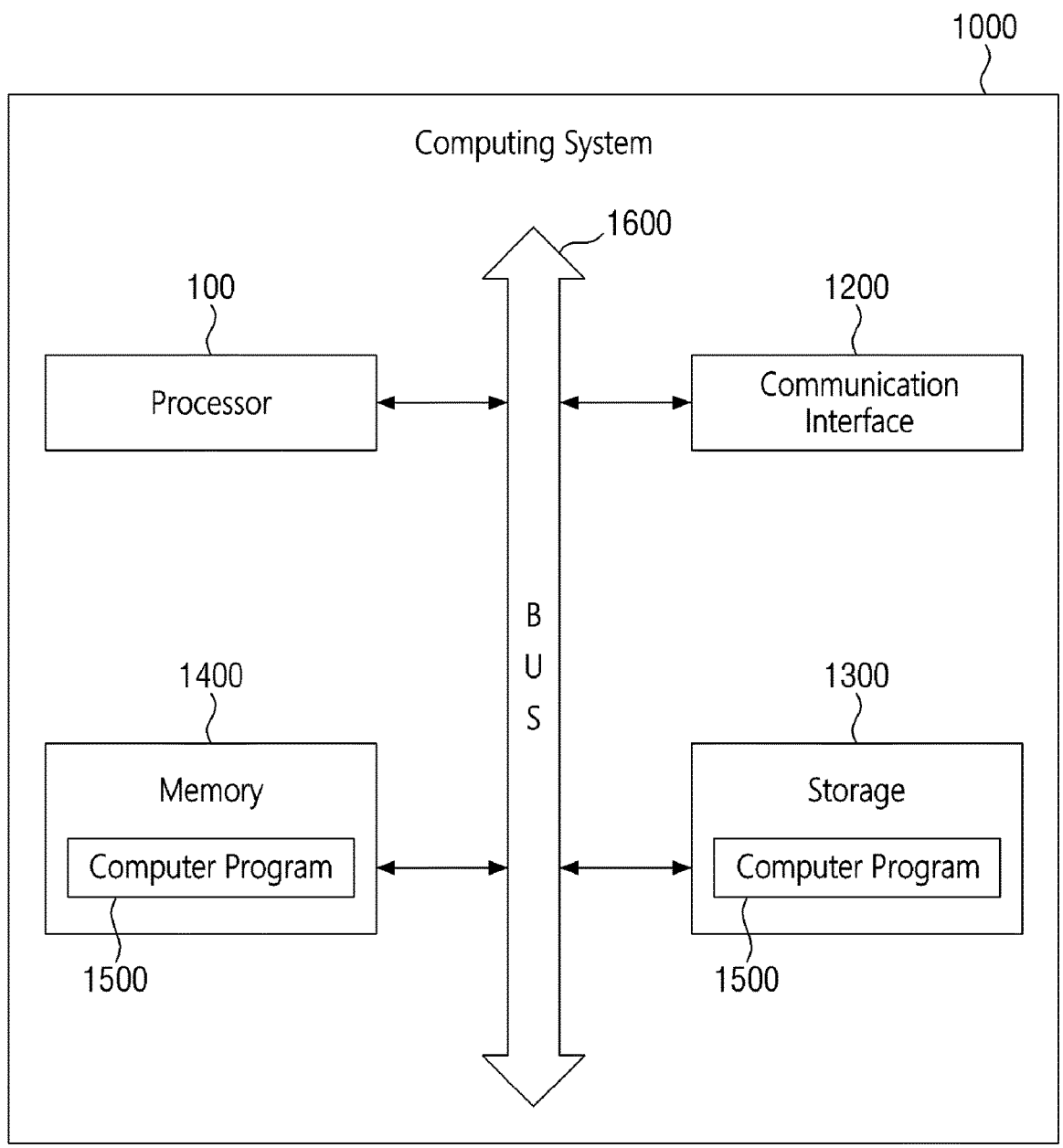
FIG. 10 is a hardware configuration view of a computing system according to an embodiment of the present disclosure.

FIG. 10 is a hardware configuration view of an exemplary computing system 1000. The computing system 1000 in FIG. 10 may refer to, the computing system 100 described with reference to FIG. 1. Referring to FIG. 10, the computing system 1000 may include at least one processor 1100, a system bus 1600, a communication interface 1200, a memory 1400, which loads a computer program 1500 executed by the processor 1100, and a storage 1300, which stores the computer program 1500.

The processor 1100 may control the overall operations of the components of the computing system 1000. The processor 1100 may perform computations for at least one application or program for executing operations/methods according to some embodiments of the present disclosure. The memory 1400 may store various data, commands, and/or information. The memory 1400 may load the computer program 1500 from the storage 1300 to execute the operations/methods according to some embodiments of the present disclosure. The memory 1400 may be implemented as a volatile memory such as a random access memory (RAM), but the present disclosure is not limited thereto.

The bus 1600 may provide communication functionally among the components of the computing system 1000. The communication interface 1200 may support both wired and wireless Internet communication for the computing system 1000. The storage may temporarily store at least one computer program 1500. The computer program 1500 may include one or more instructions that, upon being loaded into the memory 1400, direct the processor 1100 to perform the operations/methods according to some embodiments of the present disclosure. In other words, by executing the loaded instructions, the processor 1100 may perform the operations/methods according to some embodiments of the present disclosure.

In some embodiments, the computing system 1000 may refer to a virtual machine implemented based on cloud technology. For example, the computing system 1000 may be a virtual machine operating on one or more physical servers within a server farm. In this example, at least some of the components of the computing system 1000, i.e., the processor 1100, the memory 1400, and the storage 1300, may be implemented as virtual hardware, and the communication interface 1200 may be implemented as a virtual networking element such as a virtual switch.

A computer program 1500 may include instructions that, when executed on a computing system 1000, perform the operations of: receiving a plurality of evaluation information for a first product; inputting the plurality of evaluation information into a key phrase extraction model; determining key phrases for the plurality of evaluation information for the first product based on the output of the key phrase extraction model; determining key words for the key phrases; grouping some of the key phrases into multiple groups, and ranking the key phrases included in each of the multiple groups.

Various embodiments of the present disclosure and their effects have been described with reference to FIGS. 1 to 10. However, the technical concepts of the present disclosure are not limited to the effects set forth herein, and other effects not explicitly mentioned may be readily understood by those skilled in the art to which the present disclosure, from the provided description below.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method of deriving quality improvement requirements, performed by a computing system, the method comprising:
   receiving a plurality of evaluation information for a first product from an evaluation information database;
   inputting the plurality of evaluation information into a key phrase extraction model and determining key phrases for the plurality of evaluation information based on an output of the key phrase extraction model;
   grouping some of the key phrases for the plurality of evaluation information into multiple groups and storing information on each of the multiple groups in a memory;
   ranking the key phrases included in each of the multiple groups and storing information associated with the ranks of the key phrases included in each of the multiple groups in the memory; and
   determining top n key phrases from each of the multiple groups as quality improvement requirements, based on ranking results for the key phrases included in each of the multiple groups.

2. The method of claim 1, further comprising:
   crawling the plurality of evaluation information for the first product from the Internet.

3. The method of claim 1, wherein the key phrase extraction model includes a transformer model trained based on evaluation information for multiple products.

4. The method of claim 1, wherein the determining the key phrases for the plurality of evaluation information, comprises extracting n candidate phrases from each of the plurality of evaluation information, ranking the candidate phrases based on weighted averages and weighted sums of the candidate phrases and a number of times each of the candidate phrases is included in the plurality of evaluation information, and determining the key phrases for the plurality of evaluation information based on ranking results for the candidate phrases.

5. The method of claim 1, further comprising determining key words for the key phrases for the plurality of evaluation information, based on the key phrases for the plurality of evaluation information.

6. The method of claim 5, wherein the determining the key words for the key phrases for the plurality of evaluation information, comprises extracting nouns and roots contained in each of the key phrases for the plurality of evaluation information.

7. The method of claim 5, wherein the grouping some of the key phrases for the plurality of evaluation information, comprises extracting topic words for a plurality of topics from the plurality of evaluation information, and grouping some of the key phrases for the plurality of evaluation information into multiple groups based on similarities between the key words and the topic words.

8. The method of claim 1, wherein the ranking the key phrases included in each of the multiple groups, comprises ranking key phrases included in a first group, among the multiple groups, based on weighted averages and weighted sums of the corresponding key phrases and a number of times each of the corresponding key phrases is included in the first group.

9. A computing system comprising:
   at least one processor; and
   a memory storing one or more instructions,
   wherein by executing the stored instructions, the at least one processor performs operations of: receiving a plurality of evaluation information for a first product from an evaluation information database; inputting the plurality of evaluation information into a key phrase extraction model and determining key phrases for the plurality of evaluation information based on an output of the key phrase extraction model; grouping some of the key phrases for the plurality of evaluation information into multiple groups and storing information on each of the multiple groups in a memory; ranking the key phrases included in each of the multiple groups and storing information associated with the ranks of the key phrases included in each of the multiple groups in the memory; and determining top n key phrases from each of the multiple groups as quality improvement requirements, based on ranking results for the key phrases included in each of the multiple groups.

10. The computing system of claim 9, wherein the operation of determining the key phrases for the plurality of evaluation information, comprises operations of: extracting n candidate phrases from each of the plurality of evaluation information; ranking the candidate phrases based on weighted averages and weighted sums of the candidate phrases and a number of times each of the candidate phrases is included in the plurality of evaluation information; and determining the key phrases for the plurality of evaluation information based on ranking results for the candidate phrases.

11. The computing system of claim 9, wherein the at least one processor further performs an operation of determining key words for the key phrases for the plurality of evaluation information, based on the key phrases for the plurality of evaluation information.

12. The computing system of claim 11, wherein the operation of determining the key words for the key phrases for the plurality of evaluation information, comprises an operation of extracting nouns and roots contained in each of the key phrases for the plurality of evaluation information.

13. The computing system of claim 11, wherein the operation of grouping some of the key phrases for the plurality of evaluation information, comprises operations of: extracting topic words for a plurality of topics from the plurality of evaluation information; and grouping some of the key phrases for the plurality of evaluation information into multiple groups based on similarities between the key words and the topic words.

14. The computing system of claim 9, wherein the operation of ranking the key phrases included in each of the multiple groups, comprises an operation of ranking key phrases included in a first group, among the multiple groups, based on weighted averages and weighted sums of the corresponding key phrases and a number of times each of the corresponding key phrases is included in the first group.

15. The computing system of claim 9, wherein the at least one processor further performs an operation of crawling the plurality of evaluation information for the first product from the Internet.

16. The computing system of claim 9, wherein the key phrase extraction model includes a transformer model trained based on evaluation information for multiple products.

\* \* \* \* \*